United States Patent [19]

Ohya et al.

[11] Patent Number: 4,662,115
[45] Date of Patent: May 5, 1987

[54] VEHICLE DOOR

[75] Inventors: Takegi Ohya; Noboru Shono, both of Hiroshima, Japan

[73] Assignee: Mazda Motor Corporation, Hiroshima, Japan

[21] Appl. No.: 820,649

[22] Filed: Jan. 21, 1986

[30] Foreign Application Priority Data

Jan. 21, 1985 [JP] Japan .............................. 60-6944[U]
Jan. 21, 1985 [JP] Japan .................................. 60-9709
Jan. 21, 1985 [JP] Japan .................................. 60-9710

[51] Int. Cl.$^4$ ............................................. B60J 5/04
[52] U.S. Cl. ......................................... 49/502; 49/503
[58] Field of Search .................................. 49/502, 503

[56] References Cited

U.S. PATENT DOCUMENTS 3,782,036  1/1974  Clark et al. ........................... 49/502
4,428,157  1/1984  Engelsberger et al. ............. 49/502
4,512,240  4/1985  Mahler et al. ........................ 49/503

Primary Examiner—Kenneth Downey
Attorney, Agent, or Firm—Gerald J. Ferguson, Jr.; Michael P. Hoffman; Ronni S. Malamud

[57] ABSTRACT

A vehicle door comprises an outer panel of synthetic resin and an inner panel of steel plate. A door hinge and a door lock device are mounted on the steel inner panel.

11 Claims, 18 Drawing Figures

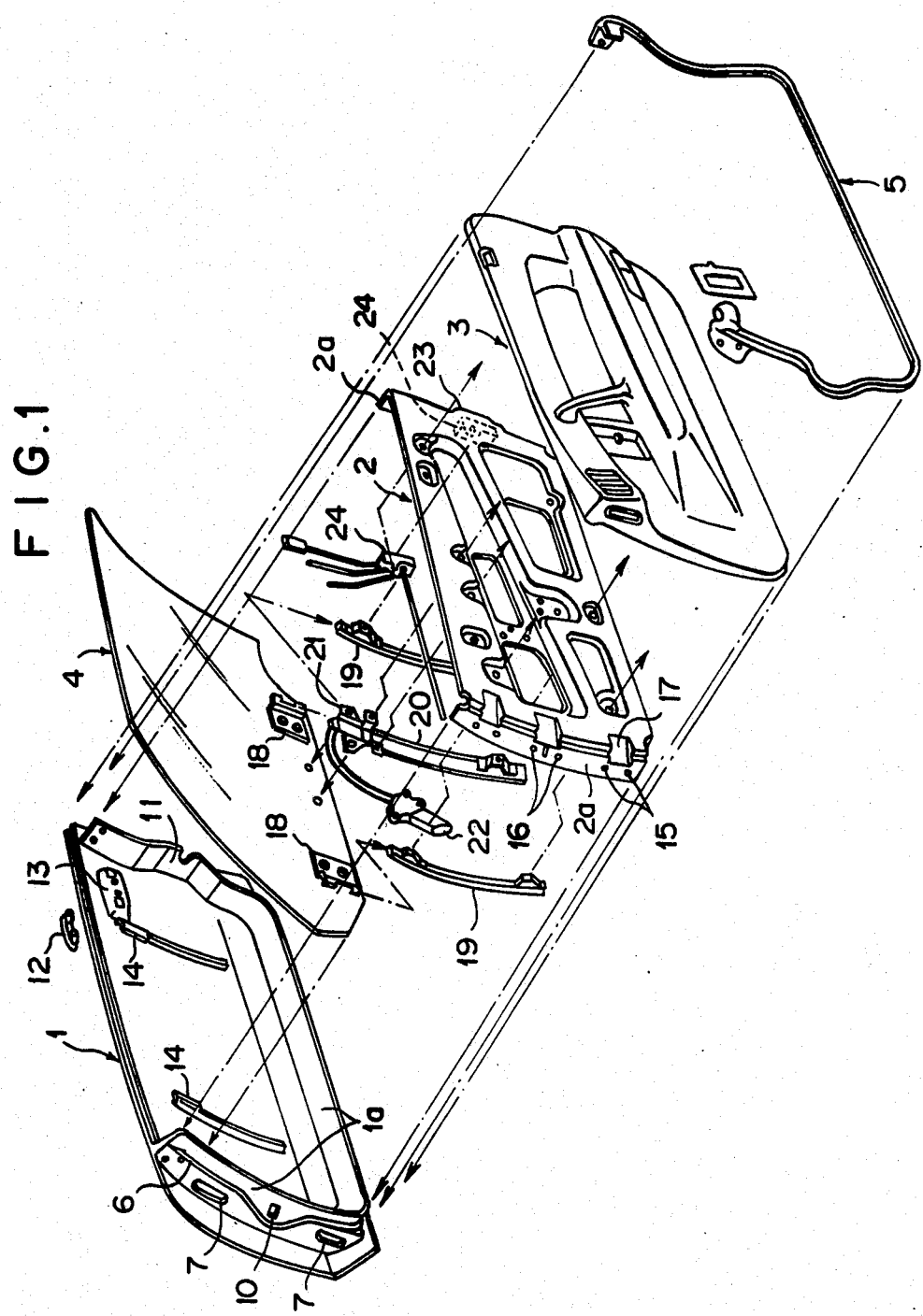

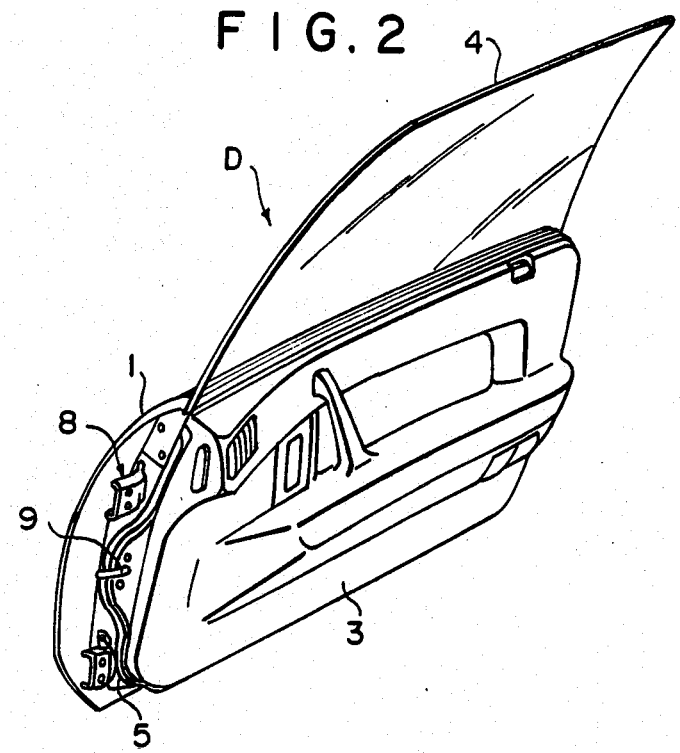
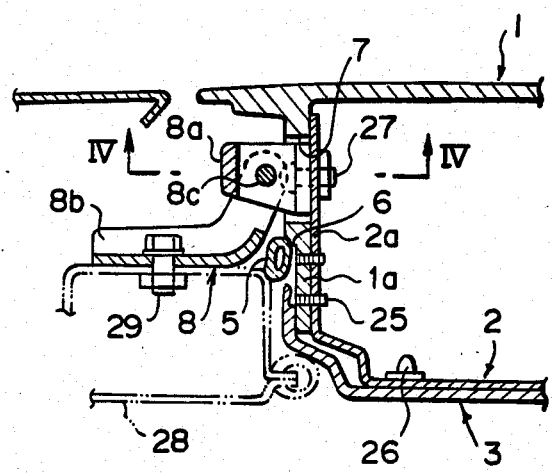
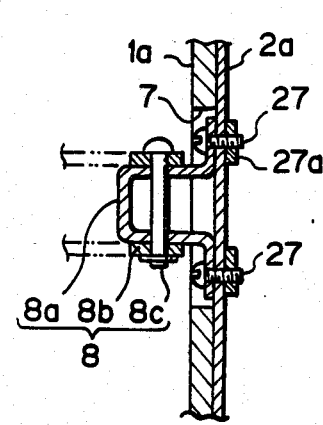

VEHICLE DOOR

BACKGROUND OF THE INVENTION

1. Field of the Invention

This invention relates to a door for a vehicle.

2. Description of the Prior Art

The vehicle door has conventionally comprised outer and inner panels both formed of steel plates. Recently, doors formed of synthetic resin have been proposed to save weight and for design-related purposes.

For example, there is disclosed in Japanese Unexamined Utility Model Publication No. 56(1981)-124015 a plastic vehicle door comprising outer and inner panels integrally formed by blow molding.

However, such a plastic vehicle door comprising integrally molded outer and inner panels gives rise to various problems.

First, since the thermal expansion coefficient of synthetic resin is generally up to ten times as large as that of steel, normal operation of the windowpane sliding mechanism, the door lock device and the like incorporated in the door can be prevented due to thermal expansion or thermal shrinkage of the door panels. Further, due to differences between the mounting structure on the synthetic resin door panel and the mounting structure on the steel door panel, various parts which have been used in the conventional steel door cannot be used in the synthetic resin door.

Second, since synthetic resin material is generally weaker than steel in strength and rigidity, steel reinforcements must be incorporated in the synthetic resin door in order to obtain sufficient rigidity of the door panels or to reinforce parts which must bear a local heavy load, because if the wall thickness of the synthetic resin door panels is increased instead, use of such synthetic resin door contributes little to weight-saving. Therefore, the conventional synthetic resin door cannot simplify the manufacturing process of the door.

Third, since, in the case of the integrally-molded synthetic resin door, even a slight change in the body line of the vehicle body affects the whole door, the integrally-molded synthetic resin door is disadvantageous with respect to developing variants of the body style.

Fourth, it is difficult to improve the workability of the door, since various parts must be mounted through the space between the inner and outer panels.

SUMMARY OF THE INVENTION

In view of the foregoing observations and description, the primary object of the present invention is to provide a vehicle door in which parts used in the conventional steel plate doors can be used and which is advantageous with respect to developing variants of the body style and has improved workability, while the various merits of the synthetic resin door are not substantially sacrificed.

The vehicle door in accordance with the present invention comprises an outer panel of synthetic resin and an inner panel of steel plate, and a door hinge and a door lock device are mounted on the inner panel.

Since the door hinge and the door lock device are mounted on the inner panel which is made of steel and accordingly has a sufficient strength and rigidity, the outer panel need not be provided with an additional reinforcement or mounting portion, whereby the structure of the outer panel can be simplified. Further, since the inner panel on which various parts are mounted is made of steel as in a conventional door, the parts which have been used for the conventional steel doors can be used without change.

In one preferred embodiment of the present invention, the outer panel is provided with an integral peripheral wall portion which projects inward (in this specification, the term "inward" designates the direction toward the inside of the passenger compartment of the vehicle and the term "outward" designates the direction toward the outside of the same) from the inner surface of the outer panel along the front, rear and lower edges, and the inner panel is provided with integral peripheral wall portions which respectively project outward from the front and rear edges and are adapted to be fitted on the peripheral wall portion of the outer panel. Said mounting seat for the door hinge is provided on one of the peripheral wall portions of the inner panel and said mounting seat for the door lock device is provided on the other peripheral wall portion of the inner panel.

In this embodiment, since the outer panel can be connected with the inner panel by fitting the peripheral wall portions on each other after the parts are mounted on the inner panel, workability in assembling the door is substantially improved.

Further, since the outer panel is fitted on the inner panel by way of the peripheral wall portions, the inner panel and the parts to be mounted on the inner panel can be used even if the body line is somewhat changed. Therefore, the door in accordance with this embodiment is particularly advantageous in developing variants of the body style.

BRIEF DESCRIPTION OF THE DRAWINGS

FIG. 1 is an exploded perspective view of a vehicle door in accordance with an embodiment of the present invention, FIG. 2 is a perspective view of the vehicle door in the assembled state, FIG. 3 is a fragmentary cross-sectional view showing the door hinge mounting portion of the vehicle door, FIG. 4 is a cross-sectional view taken along line IV—IV in FIG. 3.

DESCRIPTION OF THE PREFERRED EMBODIMENTS

Figure 5:
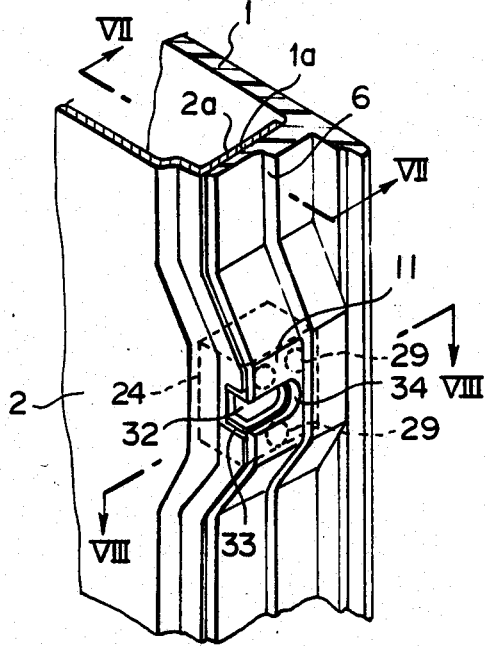
FIG. 5 is a fragmentary perspective view of the the door lock mounting portion of the door.

In FIGS. 1 and 2, a vehicle door D in accordance with an embodiment of the present invention comprises a door body including an outer panel 1 and an inner panel 2, a trim member 3, a windowpane 4 and various other accessories. The outer panel 1 is formed of synthetic resin such as polyvinyl chloride (PVC), polypropylene (PP), polyethylene (PE), ABS resin and the like. A continuous peripheral wall portion 1a is integrally formed on the inner surface of the outer panel 1 to project inward along the front, rear and lower edges of the outer panel 1.

A shoulder 6 to which a seal member 5 is attached is formed on the outer surface of the peripheral wall portion 1a at an intermediate height. A pair of openings 7 for inserting door hinges 8 are formed in the part of the peripheral wall portion 1a extending along the front edge of the outer panel 1 respectively at upper and lower portions. An opening 10 for inserting a door checker 9 is formed in the part of the peripheral wall portion 1a extending along the front edge of the outer panel 1 substantially at the middle between the upper and lower edges of the outer panel 1. Substantially at the middle between the upper and lower edges of the outer panel 1, the part of the peripheral wall portion 1a extending along the rear edge of the outer panel 1 is bowed rearward to form a trapezoidal bulging portion 11.

Reference numerals 12, 13 and 14 respectively denote an outside handle 12, a handle mounting portion on which the outside handle 12 is mounted from the outside, and a limiter for limiting the position of the outer surface of the windowpane 4.

The inner panel 2 is formed of steel plate, and a continuous peripheral wall portion 2a is integrally formed on the outer surface (facing the outer panel 1) of the inner panel 2 to project outward along the front, rear and lower edges of the outer panel 2. The peripheral wall portion 2a of the inner panel 2 is adapted to fit into the peripheral wall portion 1a of the outer panel 1.

Two pairs of threaded holes 15 for mounting door hinges 8 are formed in the part of the peripheral wall portion 2a extending along the front edge of the inner panel 2 at portions respectively corresponding to said openings 7 of the outer panel 1. A pair of threaded holes 16 for mounting the door checker 9 are provided in the part of the peripheral wall portion 2a extending along the front edge of the inner panel 2 at the portion corresponding to the opening 10 of the outer panel 1.

Reference numerals 17 denote inclined wall portions which are formed at suitable intervals over the entire length of the peripheral wall portion 2a to increase the rigidity of the peripheral wall portion 2a.

A pair of guide rails 19 for guiding a pair of guide fitments 18 are fixed to the outer surface of the inner panel 2 by a pair of screws, and a guide rail 20 for a windowpane up/down device is fixed to the outer surface of the inner panel 2 by a pair of screws. The guide rail 20 guides a carriage 21 fixed to the intermediate portion of the lower portion of the windowpane 4 and an electric motor 22 for driving the carriage 21 up and down by way of a wire is fixed to the outer surface of the inner panel 2.

At the middle of the part of the peripheral wall portion 2a extending along the rear edge of the inner panel 2 is formed a bulging portion 23 which fits into the bulging portion 11 of the outer panel 1 and a door lock device 24 is mounted on the bulging portion 23.

The structure for mounting the door hinges 8 will be described with reference to FIGS. 3 and 4, hereinbelow.

The outer panel 1 and the inner panel 2 are mated with each other with the peripheral wall portion 2a of the inner panel 2 fitting into the peripheral wall portion 1a of the outer panel 1, and the peripheral wall portions 1a and 2a are fixed together by screws 25 at suitable intervals over the entire length thereof. The peripheral wall portions 1a and 2a may be fixed together by adhesive or other bonding means. The trim member 3 is fixed to the inner surface (facing the inside of the passenger compartment) of the inner panel 2 by fasteners 26.

Each of the door hinges 8 comprises a movable portion 8a and a stationary portion 8b connected, by way of a pin 8c, to the movable portion 8a for pivotal motion relative to the movable portion 8a. The movable portion 8a is passed through the opening 7 of the outer panel 1 and is fixed to the peripheral wall portion 2a of the inner panel 2 by screws 27, and the stationary portion 8b is fixed to a pillar 28 of the vehicle body by bolts 29. The screws 27 for fixing the movable portion 8a are screwed into nuts 27a which are fixed to the inner surface of the peripheral wall portion 2a of the inner panel 2 in advance.

The door hinge 8 need not be limited to the type described above but may be of any type provided that the door hinge has a movable portion to be fixed to the peripheral wall portion 2a of the inner panel 2 through the opening 7 of the outer panel 1.

By mounting the door hinge 8 on the peripheral wall portion 2a of the inner panel 2 which is formed of steel, the peripheral wall portion 1a of the outer panel 1 formed of synthetic resin is prevented from being exposed to a localized heavy load and to chemical attack by, for instance, grease for lubricating the door hinge 8, whereby the door hinge mounting structure can be simplified.

The structure for mounting the door lock device 24 will be described with reference to FIGS. 5 to 8, hereinbelow.

When the outer panel 1 and the inner panel 2 are mated with each other as described above, the bulging portion 23 formed in the peripheral wall portion 2a of the inner panel 2 fits into the bulging portion 11 formed in the peripheral wall portion 1a of the outer panel 1. The door lock device 24 is disposed inside the bulging portion 23 and fixed to the peripheral wall portion 2a of the inner panel 2 by screws at upper and lower portions thereof.

Figure 6:
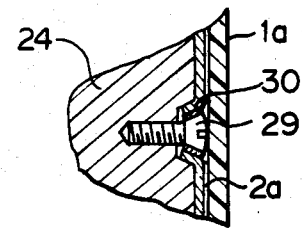
FIG. 6 is a fragmentary cross-sectional view of a part of the door lock mounting portion.
Figure 8:
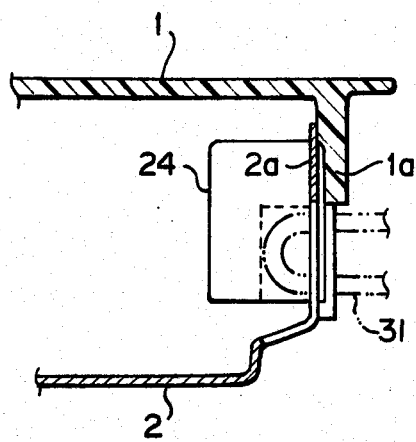
FIG. 8 is a cross-sectional view taken along line VIII—VIII in FIG. 5.
Figure 7:
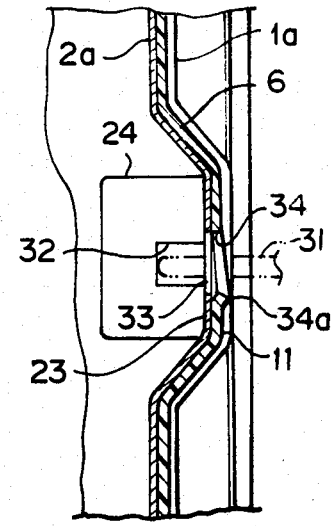
FIG. 7 is a cross-sectional view taken along line VII—VII in FIG. 5.

In order to prevent the head of each of the screws 29 from projecting from the outer surface of the peripheral wall portion 2a, the portion of the peripheral wall portion 2a circumscribing the screw hole is recessed to form a tapered recess as clearly shown in FIG. 6, and the screw 29 is screwed into the screw hole and the door lock device 24 through a toothed washer 30.

When the coating on the screw 29 is scratched by the toothed washer 30, the screw 29 is apt to rust at the scratched portion. However, since the bulging portion 23 of the inner panel 2 is covered with the bulging portion 11 of the outer panel 1, the screw 29 cannot be seen from the outside while the door is opened.

The door lock device 24 is provided with a striker inserting opening 32 between the upper and lower screwed portions. The inner panel 2 is provided with striker inserting opening 33 at a portion in the bulging portion 23 and the portion around the bulging portion 23 corresponding to the striker inserting opening 32 of the door lock device 24. Also the outer panel 1 is provided with a striker inserting opening 34 at a portion in the bulging portion 11 corresponding to the striker holes 32 and 34.

In order to prevent rain or washing water from entering the passenger compartment along the striker 31, the lower edge 34a of the striker inserting opening 34 of the outer panel 1 is positioned higher than the lower edge of the striker inserting opening 33 of the inner panel 2, and is bulged outward, and the striker 31 is arranged to be brought into contact with or to be positioned near the lower edge 34a of the striker inserting opening 34.

With this arrangement, water flowing along the striker 31 flows into the inside of the door body by way of the lower edge 34a.

In assembling the vehicle door D of this embodiment, first the door checker 9, guide rails 19 and 20, motor 20, door lock device 24 and the like are mounted on the inner panel 2, and then the outer panel 1 is mated with the inner panel 2. Thereafter, the door hinge 8 and the outside handle 12 are mounted and then the trim member 3, sealing member 5, windowpane 4 and the like are mounted.

This procedure in which the outer and inner panels are mated with each other after the various parts are mounted on the inner panel permits substantial simplification of the door assembling process.

In the embodiment described above, the peripheral wall portions 1a and 2a are fixed together by screws 25. However, the peripheral wall portions 1a and 2a may be fixed together by force-fitting a plurality of right-triangle projections formed on the peripheral wall portion 2a of the inner panel 2 into a like number of recesses or holes formed in the peripheral wall portion 1a of the outer panel 1.

Figure 9:
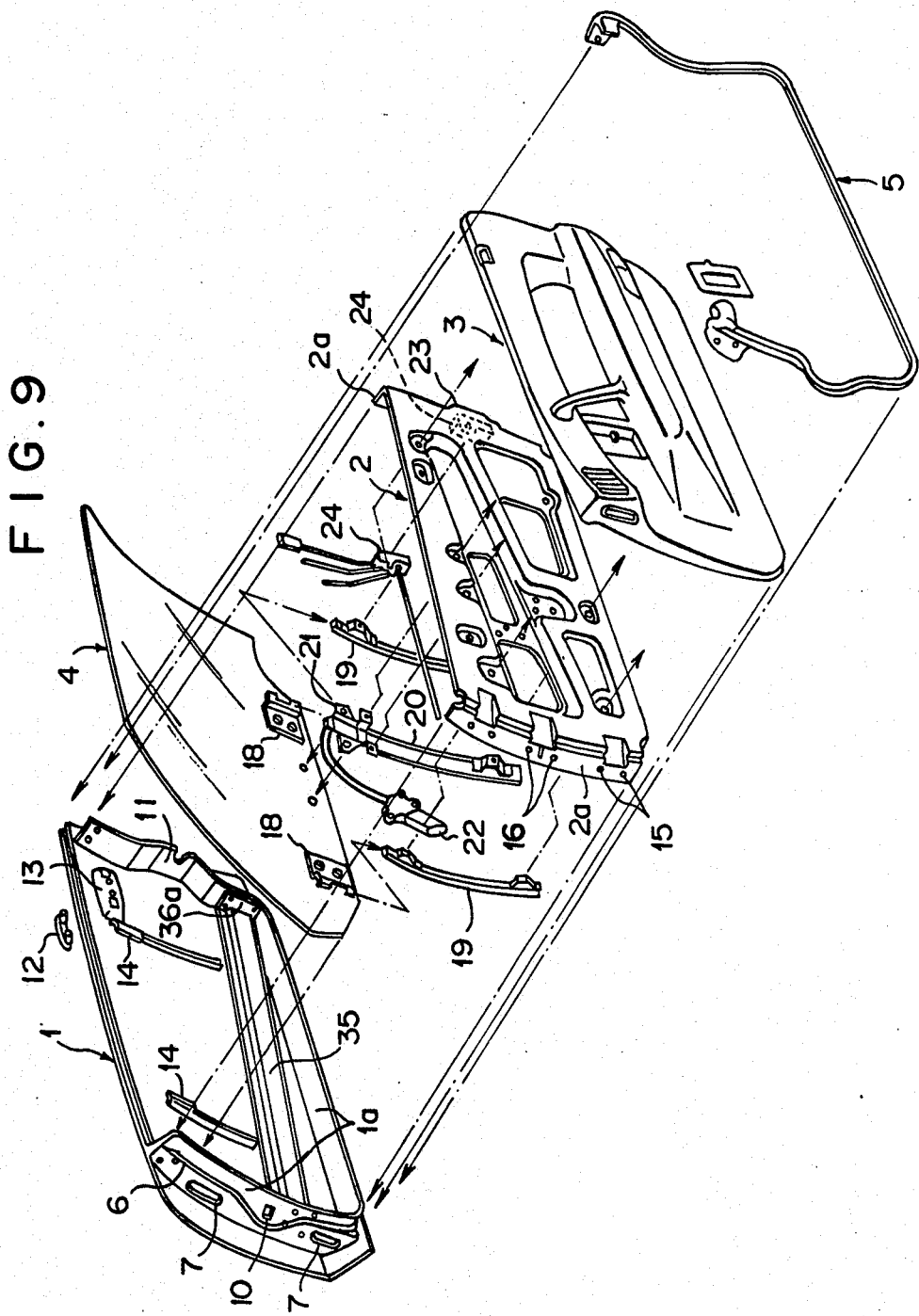
FIG. 9 is a view similar to FIG. 1 but showing a vehicle door in accordance with another embodiment of the present invention.
Figure 10:
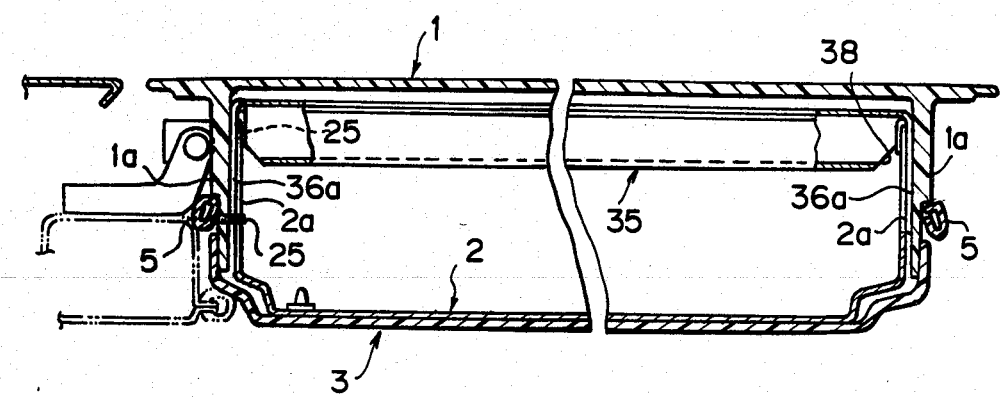
FIG. 10 is a fragmentary cross-sectional view showing the reinforcement mounting portion of the door of FIG. 9.
Figure 11:
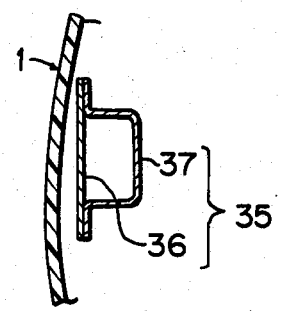
FIG. 11 is a fragmentary cross-sectional view showing a part of the reinforcement mounting portion.
Figure 12:
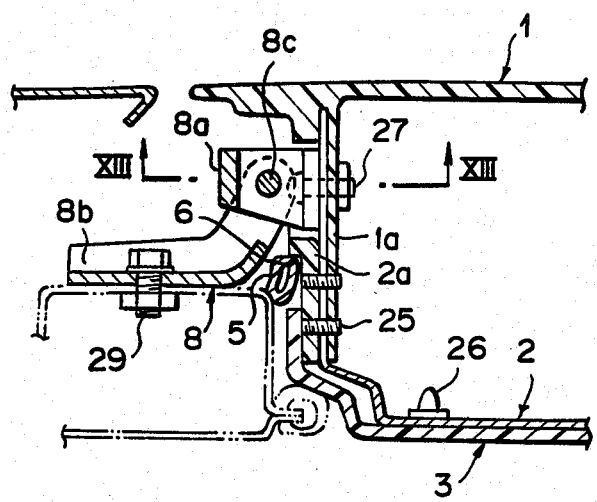
FIG. 12 is a fragmentary cross-sectional view showing the door hinge mounting portion of a vehicle door in accordance with still another embodiment of the present invention.
Figure 13:
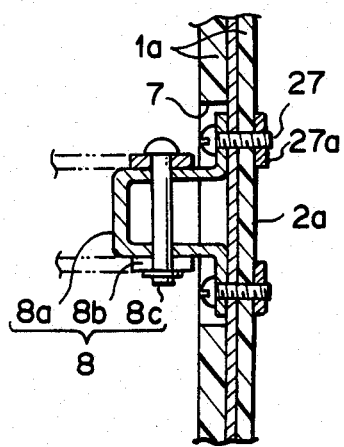
FIG. 13 is a cross-sectional view taken along line XIII—XIII in FIG. 12.
Figure 14:
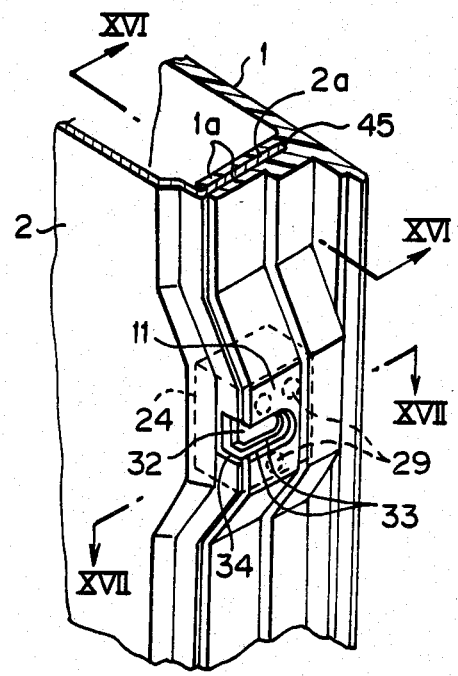
FIG. 14 is a fragmentary perspective view of the the door lock mounting portion of the door.
Figure 15:
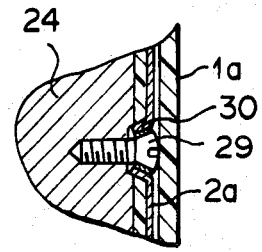
FIG. 15 is a fragmentary cross-sectional view of a part of the door lock mounting portion.
Figure 16:
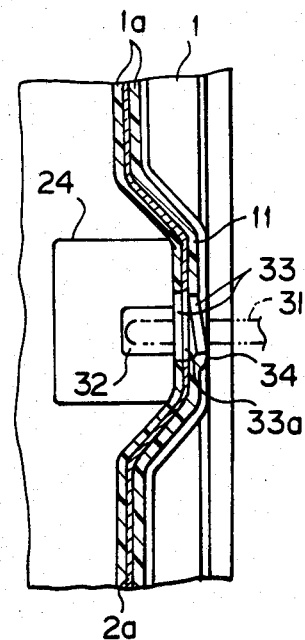
FIG. 16 is a cross-sectional view taken along line XVI—XVI in FIG. 14.
Figure 17:
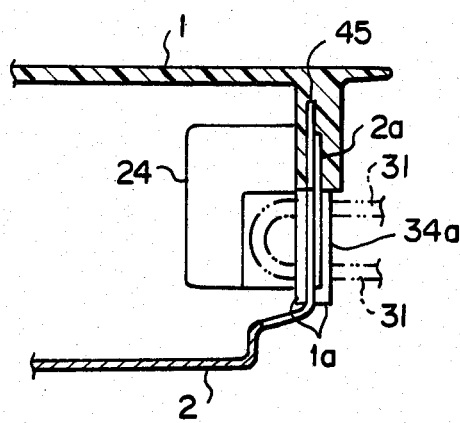
FIG. 17 is a cross-sectional view taken along line XVII—XVII in FIG. 14.

The vehicle door in accordance with another embodiment of the present invention shown in FIGS. 9 to 11 is provided with a reinforcement 35 for reinforcing strength and rigidity of the outer panel 1. In FIGS. 9 to 11, the parts analogous to the parts shown in FIGS. 1 to 8 are given the same reference numerals and will not be described in detail here. The reinforcement 35 is disposed in a downward portion of the space between the outer panel 1 and the inner panel 2 to extend fore and aft of the vehicle body slightly spaced from the inner surface of the outer panel 1. The front and rear end portions of the reinforcement 35 are sandwiched between the peripheral wall portion 1a of the outer panel 1 and the peripheral wall portion 2a of the inner panel 1 and thereby fixed thereto.

As clearly shown in FIG. 11, the reinforcement 35 comprises a flat plate 36 and a channel member 37 which is U-shaped in cross section and is provided with upper and lower flanges extending in the longitudinal direction thereof. The channel member 37 is welded to the flat plate 36 at the upper and lower flanges to form a light-weight closed-cross-section structure. The flat plate 36 is provided with a pair of mounting flanges 36a at the respective front and rear ends thereof. The mounting flanges 36a extend outward along the inner surface of the peripheral wall portion 1a of the outer panel 1 and are sandwiched between the peripheral wall portion 1a of the outer panel 1 and the peripheral wall portion 2a of the inner panel 2, and fixed thereto in place by the screws 25. The mounting flanges 36a may be fixed to the peripheral wall portions 1a and 2a by other means such as adhesive. Reference numeral 38 denotes a guide portion for guiding the peripheral wall portions 2a of the inner panel 2 during assembly.

The reinforcement 35 may be disposed in an upward portion or an intermediate portion. Even a plurality of such reinforcements may be provided.

There has been known a vehicle door having an outer panel provided with a steel reinforcement embedded in a synthetic resin body. This vehicle door is disadvantageous in that the size and the shape of the reinforcement is significantly limited and in that the steel reinforcement is apt to be plastically deformed, deforming the overall outer panel structure, thereby cancelling the advantage of the synthetic resin outer panel that it is hard to plastically deform. Further, the known outer panel is disadvantageous in that it is almost impossible to repair the known outer panel when it is once deformed. The vehicle door in accordance with the embodiment shown in FIGS. 9 to 11 is advantageous over the known vehicle door in that it is relatively free from limitations in manufacturing the synthetic resin outer panel, the overall structure of the outer panel is not plastically deformed if the steel reinforcement should be plastically deformed, and the outer panel can be repaired by dismantling it if the reinforcement should be plastically deformed. Further, the reinforcement 35 is easy to incorporate into the door body.

FIGS. 12 to 18 show still another embodiment of the present invention. In FIGS. 12 to 18, the parts analogous to the parts shown in FIGS. 1 to 8 are given the same reference numerals and will not be described in detail here. The main difference between the embodiment shown in FIGS. 1 to 8 and that shown in FIGS. 12 to 18 is that, in the latter embodiment, the peripheral wall portion 1a of the outer panel 1 is provided with a continuous groove 45 which extends substantially over the entire length of the peripheral wall portion 1a and in which the peripheral wall portion 2a of the inner panel 2 is snugly received. This arrangement is advantageous in that the top surface of the peripheral wall portion 2a of the inner panel 2, on which paint can hardly be coated, can be protected from washing water, rain and the like by the peripheral wall portion 1a of the outer panel 1 which is made of synthetic resin and is resistant to corrosion.

Figure 18:
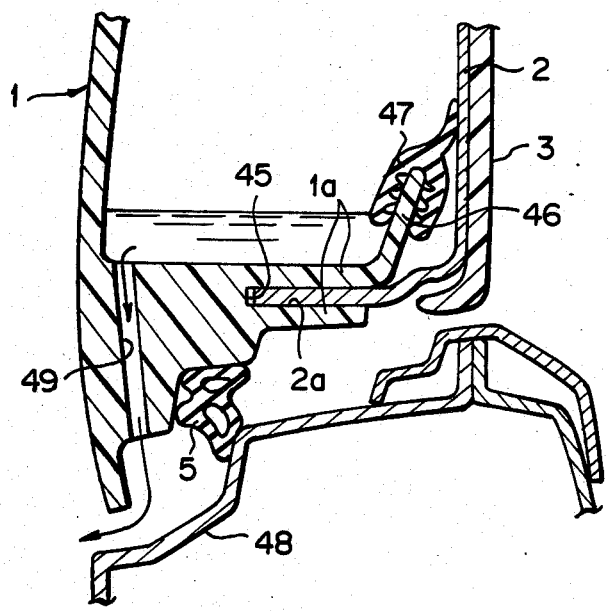
FIG. 18 is a cross-sectional view of a lower portion of the door.

Further, as shown in FIG. 18, the portion of the peripheral wall portion 1a of the outer panel 1 extending along the lower edge thereof is provided with a continuous flange portion 46 which extends obliquely upwardly and a rubber seal 47 is attached to the top of the flange portion 46. The rubber seal 46 has a lip portion and the lip portion is in close contact with the inner surface of the inner panel 2, whereby the portion of the peripheral wall portion 2a of the inner panel 2 which extends along the lower edge thereof and is of steel is protected from washing water, rain and the like entering the door body. Further, a drain hole 49 is provided in the peripheral wall portion 1a to open on the outer side of the seal member 5 in contact with a side sill 48. The oblique flange portion 46 also functions as a guide in fitting the peripheral wall portion 2a of the inner panel 2 into the groove 45 of the outer panel 1.

The portion of the peripheral wall portion 1a of the outer panel 1 on the outside of the groove 45 may extend only up to the shoulder 6.

We claim:

1. A vehicle door comprising an outer panel of synthetic resin, an inner panel of steel plate, and a door hinge and a door lock device mounted on the inner panel, further comprising a peripheral wall portion which is integrally formed on the inner surface of said outer panel to project inward along the front, rear and lower edges of the outer panel and a pair of peripheral wall portions are integrally formed on the outer surface of the inner panel to project outward along the front and rear edges of the outer panel, the peripheral wall portions of the inner panel being mated with the peripheral wall portion of the outer panel, said door hinge being mounted on one of the peripheral wall portions of the inner panel and said door lock device being mounted on the other peripheral wall portion of the inner panel.

2. A vehicle door as defined in claim 1 in which said peripheral wall portions of the inner panel are fitted into the inside of the peripheral wall portion of the outer panel and the peripheral wall portion of the outer panel is provided with an opening through which said hinge extends outward.

3. A vehicle door as defined in claim 2 in which the portion at which said door lock device is mounted on the inner panel is covered with the peripheral wall portion of the outer panel.

4. A vehicle door as defined in claim 1 in which the portion at which said door lock device is mounted on the inner panel is covered with the peripheral wall portion of the outer panel.

5. A vehicle door as defined in claim 4 in which said inner and outer panels are respectively provided with a striker inserting opening which gives access to the door lock device to a striker to be engaged therewith, and the lower edge of the striker inserting opening of the outer panel is positioned higher than that of the inner panel and is bulged outward.

6. A vehicle door as defined in claim 1 in which said inner panel is further provided with a lower peripheral wall portion integrally formed on the inner surface thereof to project inward along the lower edge, the peripheral wall portion of the outer panel being provided with a groove which extends along the portion of the peripheral wall portion extending along the lower edge of the outer panel and opens toward the inner panel, the inner panel being mated with the peripheral wall portion of the outer panel with the lower peripheral wall portion of the inner panel being fitted into the groove.

7. A vehicle door as defined in claim 6 in which the portion of the peripheral wall portion of the outer panel extending along the lower edge thereof is provided with a flange portion which extends obliquely upwardly.

8. A vehicle door as defined in claim 7 in which a rubber seal is attached to the top of the flange portion and the rubber seal has a lip portion in close contact with the inner surface of the inner panel.

9. A vehicle door as defined in claim 8 in which a drain hole is provided in the peripheral wall portion to open on the outer side of a seal member in contact with a side sill.

10. A vehicle door as defined in claim 1 in which a reinforcement is disposed between the outer panel and the inner panel to extend fore and aft of the vehicle body, and the front and rear end portions of the reinforcement are sandwiched between the peripheral wall portions of the outer panel and the inner panel and thereby fixed thereto.

11. A vehicle door as defined in claim 10 in which said reinforcement comprises a flat plate having a pair of mounting flanges projecting inward at its respective ends, and a channel member which is U-shaped in cross section and is bonded to the flat plate to form a closed-cross-section structure.

* * * * *